United States Patent
Hendrickson et al.

(10) Patent No.: US 10,394,252 B2
(45) Date of Patent: Aug. 27, 2019

(54) SYSTEM AND METHOD FOR PLATOONING VEHICLES

(71) Applicant: Ford Global Technologies, LLC, Dearborn, MI (US)

(72) Inventors: Cory Scott Hendrickson, Ann Arbor, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/610,216

(22) Filed: May 31, 2017

(65) Prior Publication Data

US 2018/0348791 A1    Dec. 6, 2018

(51) Int. Cl.
| | | |
|---|---|---|
| *G05D 1/02* | (2006.01) | |
| *G08G 1/00* | (2006.01) | |
| *G05D 1/00* | (2006.01) | |
| *F01N 11/00* | (2006.01) | |
| *F01N 3/021* | (2006.01) | |
| *F01N 9/00* | (2006.01) | |

(52) U.S. Cl.
CPC .......... *G05D 1/0293* (2013.01); *F01N 3/021* (2013.01); *F01N 9/00* (2013.01); *G05D 1/0027* (2013.01); *G08G 1/22* (2013.01); *F01N 2900/102* (2013.01); *F01N 2900/12* (2013.01); *F01N 2900/1602* (2013.01)

(58) Field of Classification Search
CPC .............................. G05D 1/0293; F01N 3/021
See application file for complete search history.

(56) References Cited

U.S. PATENT DOCUMENTS

| | | |
|---|---|---|
| 8,352,111 B2 | 1/2013 | Mudalige |
| 9,037,389 B2 | 5/2015 | You |
| 9,376,971 B2 | 6/2016 | Luther et al. |
| 9,494,944 B2 | 11/2016 | Alam et al. |
| 9,551,993 B2 | 1/2017 | Kolhouse et al. |

OTHER PUBLICATIONS

Lammert, M. et al., "Effect of Platooning on Fuel Consumption of Class 8 Vehicles Over a Range of Speeds, Following Distances, and Mass," Proceedings of the SAE 2014 Commercial Vehicle Engineering Congress, Oct. 7, 2014, Available Online Sep. 30, 2014, Rosemont, Illinois, 14 pages.

Turri, V. et al., "Cooperative look-ahead control for fuel-efficient and safe heavy-duty vehicle platooning," IEEE Transactions on Control Systems Technology, vol. 25, No. 1, Jan. 2017, Available Online Apr. 1, 2016, 16 pages.

*Primary Examiner* — Todd M Melton (74) *Attorney, Agent, or Firm* — Julia Voutyras; McCoy Russell LLP (57) ABSTRACT

Methods and systems for organizing vehicles within a vehicle platoon are described. In one example, temperatures and storage amounts of emissions control devices in vehicles of the vehicle platoon provide a basis for determining which vehicle is a leader and which vehicles are followers in a vehicle platoon. Vehicles having emissions devices at low temperatures may be commanded to a lead position to maintain emissions control device performance.

20 Claims, 8 Drawing Sheets

SYSTEM AND METHOD FOR PLATOONING VEHICLES

BACKGROUND/SUMMARY

Two or more vehicles may travel together to reduce fuel consumption. The vehicles may travel in series where one vehicle is the leader and follower vehicles align with the rear of the leader vehicle to form a nearly straight line of vehicles behind the leader vehicle. The lead vehicle may be exposed to undisturbed air, but follower vehicles are positioned in a slip stream of air behind the lead vehicle. The slip stream is a zone of moving air generated by the leader vehicle and following vehicles that reduce air being moved by following vehicles. Fuel consumption of both the leading and following vehicles may be improved when a group of vehicles travel in a formation utilizing a slip stream. However, there may also be disadvantages for a group of vehicles traveling in a close formation where they may benefit from the slip stream.

The inventors herein have recognized several disadvantages and have developed a method for operating vehicles, comprising: moving a vehicle from a lead position in a vehicle group to a first follower position within the vehicle group and moving a first following vehicle into the leading position in the vehicle group in response to a temperature of an emissions control device of the first following vehicle being less than a first threshold temperature.

By adjusting an order of vehicles in a vehicle platoon, it may be possible to maintain vehicle emissions even if operating vehicles within a slip stream of another vehicle tends to cool an emissions control device of a following vehicle. In one example, a following vehicle may request a leader position so that the following vehicle may operate at a higher engine load to increase the temperature of emissions control devices of a following vehicle so that emissions of the following vehicle may be maintained at lower levels. In addition, a leader vehicle may request to be repositioned in a vehicle platoon as a follower vehicle during conditions where an emissions control device of the leader vehicle is increasing higher than is desired.

The present description may provide several advantages. In particular, the approach may improve emissions of vehicles in a platoon over a travel distance. Further, the approach may improve opportunities to diagnose vehicles emissions control devices. Further still, the approach provides a way of arbitrating which vehicle occupies the leader position when one or more vehicles request the leader position so that emissions performance of the group of vehicles may be at a desirable level.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
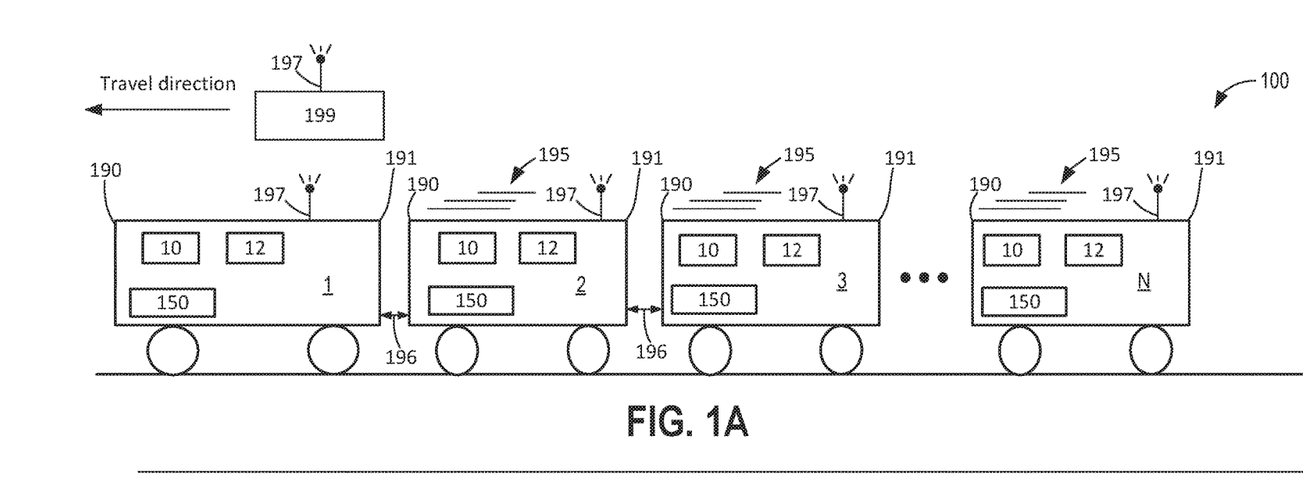
FIG. 1A shows a schematic depiction of a platoon of vehicles.
Figure 1B:
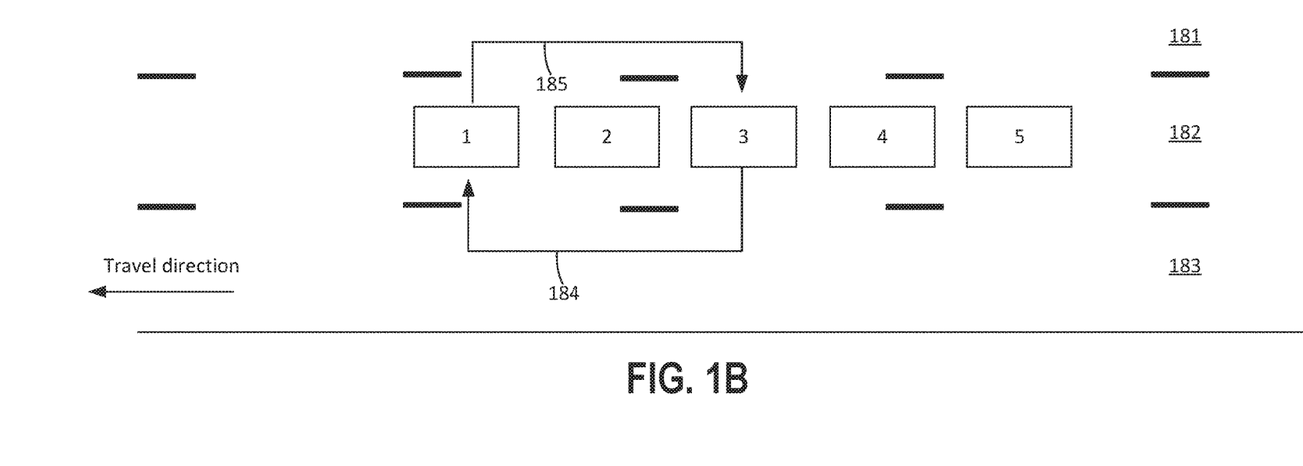
FIG. 1B shows a vehicle position swap for a platoon of vehicles.
Figure 2:
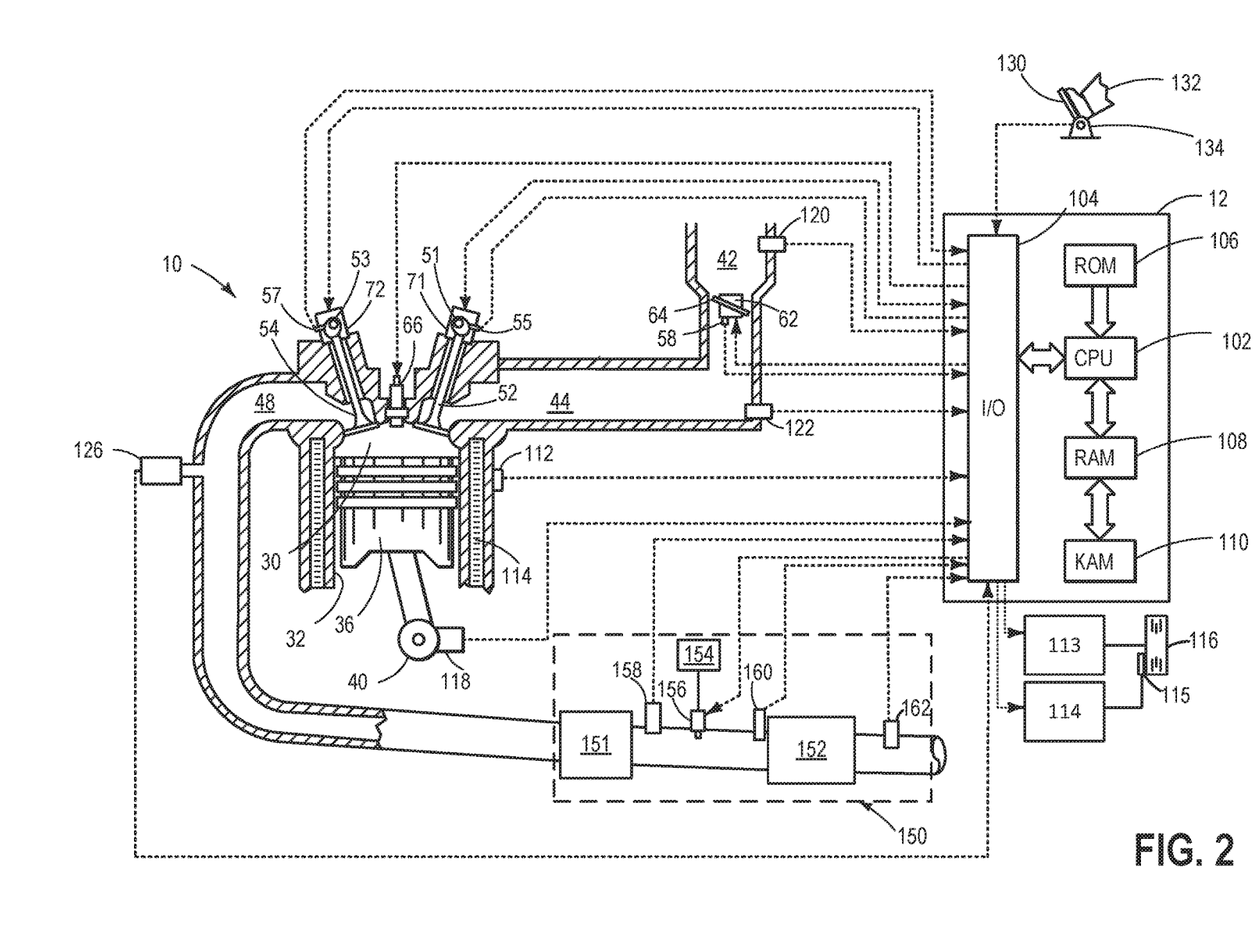
FIG. 2 shows a schematic depiction of an engine and emissions system of vehicles in the platoon of vehicles shown in FIG. 1A.
Figure 5:
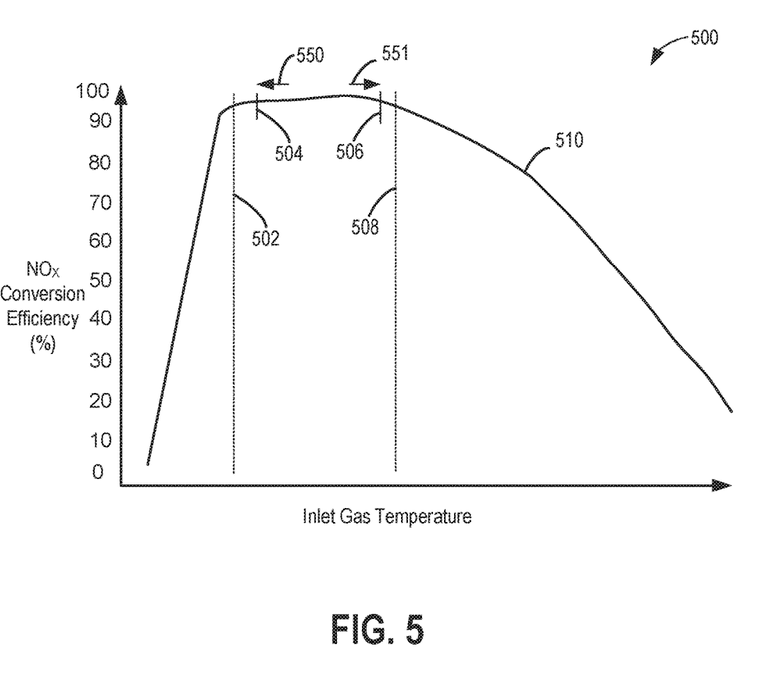
FIG. 5 shows efficiency of an emissions control device as a function of temperature.
Figure 6:
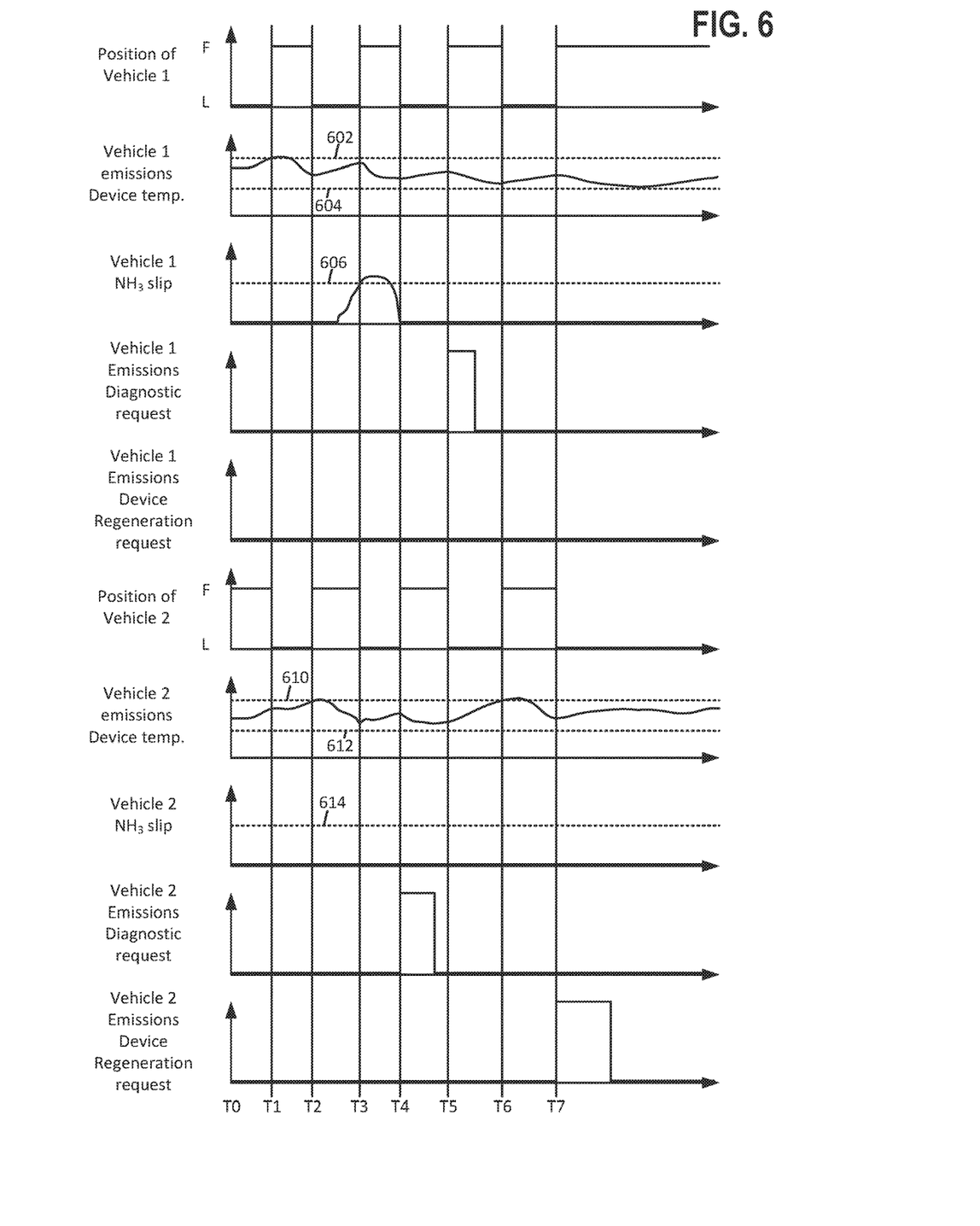
FIG. 6 shows an example vehicle platooning sequence according to the methods of FIGS. 3A, 3B, 4A, and 4B.

The present description is related to operating a plurality of vehicles in a traveling group or platoon. The vehicle platoon may be organized in a platoon as shown in FIGS. 1A and 1B to improve vehicle fuel economy. Each of the vehicles may include an engine and emissions control system as shown in FIG. 2. The lead vehicle in the platoon may be operated according to the method of FIGS. 3A and 3B. The following vehicles in the platoon may be operated according to the method of FIGS. 4A and 4B. Efficiency of an emissions control device is shown in FIG. 5 to show one basis for ordering vehicles in the platoon. FIG. 6 shows an example sequence for controlling positions of vehicles within a platoon of vehicles.

Referring now to FIG. 1A, an example vehicle platoon is shown. Platoon 100 includes vehicles 1 through N, and each vehicle includes an engine 10, a controller 12, transmitter/receiver 197, and an emissions control system 150. Vehicle data may be transmitted to remote host controller 199, and remote host controller 199 may send commands to vehicles 1-N, where N is an actual total number of vehicles in the platoon. The host controller 199 may operate as the platoon controller assigning positions in the platoon the vehicles in the platoon. For example, host controller 199 may assign vehicle number four as the leader vehicle in position number one. Alternatively, the leader vehicle in the platoon may assign positions within the platoon.

Vehicle 1 is shown in a leader position and vehicles 2-N are shown in follower positions. The distance between vehicles is indicated as 196. Each of vehicles 1-N includes a front 190 and a rear 191. The vehicles travel in a forward direction as indicated. Vehicles 2 and 3 are arranged in a series configuration with the follower vehicles positioned between a rear 191 of a first vehicle and a front 190 of a second vehicle. The lead vehicle (e.g., vehicle 1) provides an air slip stream 195 and trailing vehicles maintain the slip stream the length of the vehicle platoon.

Thus, it may be observed that the vehicles travel in series where the leader is positioned at the front of the platoon and follower vehicles continue from the lead vehicle and align with the rear of the leader vehicle to form a nearly straight line of vehicles behind the leader vehicle. The lead vehicle may be exposed to undisturbed air and follower vehicles are positioned in a slip stream of air behind the lead vehicle. The slip stream is a zone of moving air generated by the leader vehicle and following vehicles that reduce air being moved by following vehicles.

Referring now to FIG. 1B, an example vehicle swap for two vehicles of a vehicle platoon is shown. FIG. 1B is a plan view of a road that includes three lanes 181, 182, and 183.

The vehicles in the platoon are numbered 1-5. The lead vehicle is vehicle number 1 and the follower vehicles are vehicles 2-5.

In this example, vehicle number 3 swaps position with leader vehicle number 1. Vehicle 3 may swap position with vehicle 1 in response to a request by vehicle number 1 or a request by vehicle number 3. The swap of positions occurs while all vehicles in the platoon are moving. The maneuver begins by vehicle number 1 moving to lane 181 and decelerating to the position of vehicle 3. Vehicle number three moves as indicated by arrow 185. Vehicle number 3 moves to lane 183 and then accelerates to the lead position as indicated by arrow 184. Vehicle number 1 and vehicle number 3 may switch positions simultaneously. If the road contains only two lanes, the vehicle in the third position may move to the second lane and accelerate to the leader position before moving back to the first lane. Then, the former leader may move to the second lane, decelerate and then switch to the third position in the first lane.

In these ways, two vehicles in a vehicle platoon may change positions to benefit operation of each vehicle. Further, similar maneuvers may be performed on roads having different numbers of lanes without departing from the scope of this disclosure. Referring to FIG. 2, internal combustion engine 10, comprising a plurality of cylinders, one cylinder of which is shown in FIG. 2, is controlled by electronic engine controller 12. In this example, a diesel engine is shown, but engine 10 may also be a gasoline or alternative fuel engine. Electrical connections are indicted by dashed lines. The controller 12 receives signals from the various sensors of FIG. 2 and employs the various actuators of FIG. 2 to adjust engine operation based on or responsive to the received signals and instructions stored on a memory of controller 12. For example, adjusting an actual total number of active cylinders (e.g., combusting air and fuel) may include adjusting exhaust valve actuator 72 and intake valve actuator 71 to deactivate selected engine cylinders.

Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Exhaust valves may be selectively activated and deactivated by exhaust valve actuator 72. Intake valves may be selectively activated and deactivated by intake valve actuator 71. By holding intake and exhaust valves of a cylinder closed over two entire engine revolutions, the engine cylinder may be temporarily deactivated and reactivated to change the effective engine displacement. Fuel is not delivered to deactivated cylinders. For example, if the engine is an eight cylinder engine, four cylinders may be deactivated over two or more engine revolutions to operate the engine as a four cylinder engine. Further, fuel flow to the deactivated cylinders is ceased. By deactivating one or more engine cylinders, thermal efficiency of active engine cylinders may be increased to improve fuel efficiency.

Fuel injector 66 is shown positioned to inject fuel directly into combustion chamber 30, which is known to those skilled in the art as direct injection. Fuel injector 66 delivers fuel in proportion to a pulse width from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake manifold 44. In some examples, engine 10 may include a turbocharger (not shown). Combustion is initiated in combustion chamber 30 when fuel ignites via compression ignition as piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment system 150. Further, in some examples, the UEGO 126 sensor may be replaced by a NOx sensor that has both NOx and oxygen sensing elements.

Emissions system 150 may include several emissions control devices including a particulate filter (PF) 151 and a selective catalyst reduction (SCR) device 152. Further, in some examples, emission system 150 may include an oxidation catalyst or a three way catalyst for gasoline engines. Emissions system 150 is also shown with a particulate sensor 158, a urea injector 156, a urea tank 154, and NOx sensors 160 and 162. SCR device 152 reduces NOx to $N_2$ and particulate filter 151 traps particulate matter for subsequent oxidation. From time to time, storage of particulate matter in particulate filter 151 may reach a threshold level so that particulate filter 151 is regenerated by oxidizing particulate matter in particulate filter 151. The particulate matter may be oxidized by raising a temperature of particulate filter 151. Further, particulates may accumulate on particulate sensor 158 so that particulate sensor 158 may be regenerated from time to time. The particulate sensor 158 may be regenerated via oxidizing particulates that accumulate within particulate sensor 158. The particulates held within the particulate sensor 158 may be oxidized by increasing a temperature of the particulate matter.

Controller 12 may also communicate instructions to steering system 113 for adjusting a position of the vehicle in which engine 10 resides while the vehicle is moving. Steering system 113 may adjust an angle of wheels 116. For example, controller 12 may request a right turn via commanding steering system 113 to angle wheels to the right side of the vehicle. Controller 12 may also slow the vehicle in which engine 10 resides by commanding brake controller 114 to apply brakes 115 to slow wheels 116.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human driver 132; a measurement of engine manifold pressure (MAP) from pressure sensor 122 coupled to intake manifold 44; exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

The system of FIGS. 1A-2 provides for a system for controlling vehicles, comprising: a first vehicle including a receiver, a first transmitter, a first engine, and a first emissions control device, the first vehicle in a leader position in a vehicle group; a second vehicle including a receiver, second transmitter, a second engine, and a second emissions control device, the second vehicle a follower in the vehicle group; a controller including instructions stored in non-transitory memory to arbitrate requests for a leader position in the vehicle group, the requests for the leader position originating from a plurality of vehicles in the vehicle group within a window of time, the requests for the leader position based on requests for regenerating emissions control devices and temperatures of emissions control devices, and additional instructions to command one vehicle of the plurality of vehicles to the leader position. The system further comprises additional instructions to command the second vehicle to the leader position in response to a request to perform an emissions diagnostic on the first vehicle. The system further comprises additional controller instructions to command the second vehicle to the leader position in response to NH$_3$ slip from the first vehicle. The system further comprises additional controller instructions to command the first vehicle to a following position in the vehicle group in response to a request to estimate an oxygen storage capacity of a catalyst. The system further comprises additional instructions to command slowing the first vehicle in response to the requests for the leader position. The system further comprises additional instructions to command accelerating the second vehicle in response to the requests for the leader position.

Figure 3A:
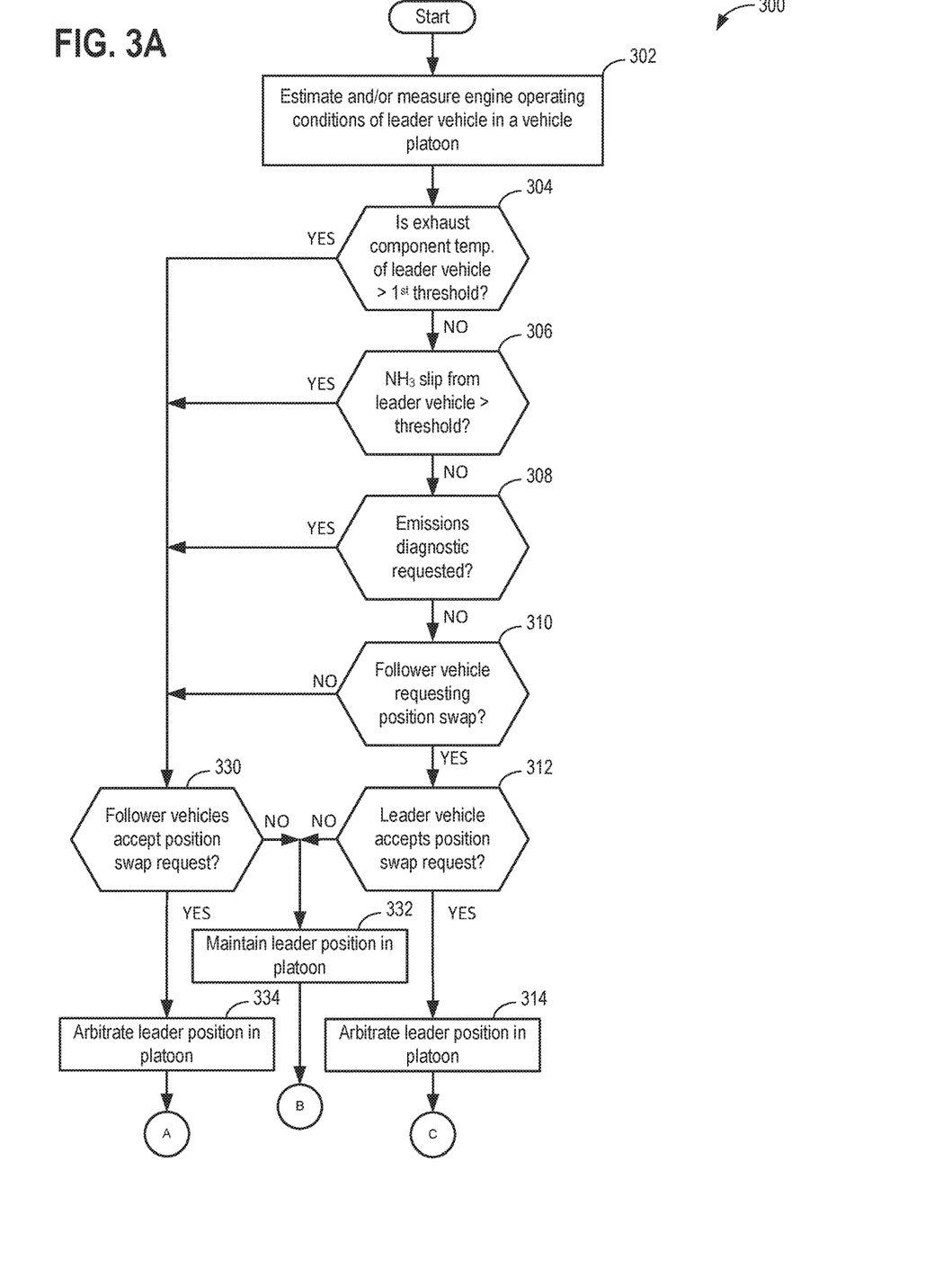
FIGS. 3A and 3B show a flowchart of a method for operating a lead vehicle of a platoon of vehicles.
Figure 3B:
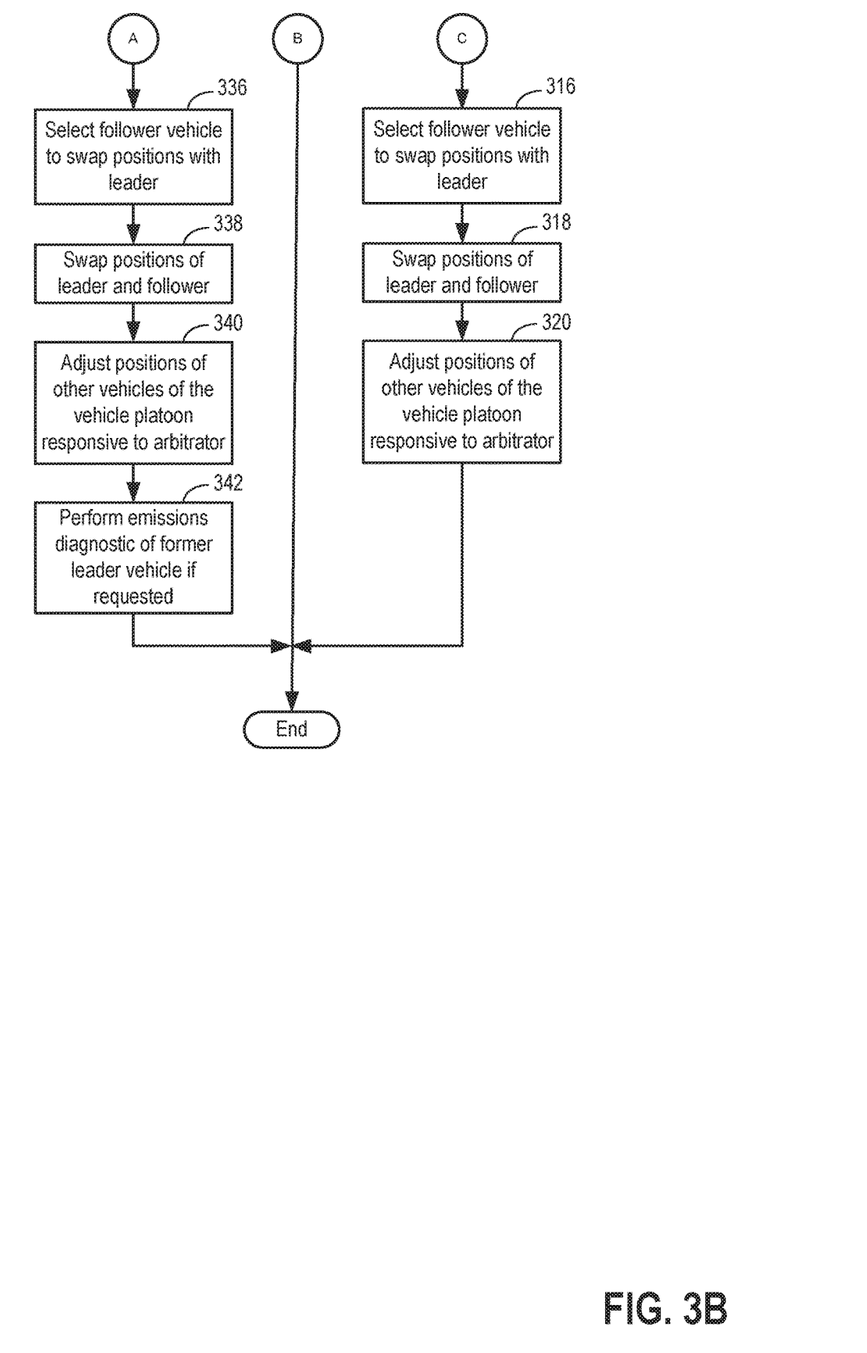

Referring now to FIGS. 3A and 3B, a method for operating a lead vehicle in a platoon of vehicles is shown. The method of FIGS. 3A and 3B may be incorporated into the system of FIG. 1A and FIG. 2 as executable instructions stored in non-transitory memory. Further, the method of FIGS. 3A and 3B may operate in cooperation and conjunction with the method of FIGS. 4A and 4B to provide the sequence shown in FIG. 6. Executable instructions for carrying out method 3A and 3B and the rest of the methods included herein may be executed by a controller based on instructions stored on a memory of the controller and in conjunction with signals received from sensors of the vehicle system, such as the sensors described above with reference to FIGS. 1A and 2. The controller may employ engine actuators of the engine system to adjust engine operation, according to the methods described below.

At 302, method 300 estimates and/or measures vehicle operating conditions of a vehicle in a lead position of a vehicle platoon. The operating conditions may include but are not limited to lead vehicle emissions device temperature, lead vehicle NH$_3$ slip (e.g., NH$_3$ that is flowing past emissions after treatment device 152 and to ambient atmosphere), emission diagnostic status for the lead vehicle, requests from follower vehicles to be lead vehicle in the vehicle platoon, positions of vehicles surrounding the lead vehicle, and environmental conditions. The conditions may be determined from output of various sensors and actuators coupled to the controller. Method 300 proceeds to 304.

At 304, method 300 judges if a temperature of an exhaust system component is greater than a threshold temperature. The exhaust system component may be a component of an emission system or an exhaust manifold. The temperature threshold may be different for each of the exhaust system components. For example, the PF temperature threshold may be a first value and the SCR temperature threshold may be a second value. If method 300 judges that temperature of an exhaust system component is greater than a threshold, the answer is yes and method 300 proceeds to 330. Otherwise, method 300 proceeds to 306.

If a temperature of an exhaust system component is greater than a threshold temperature, method 300 may request to change a position of the leader vehicle to a follower position so that the vehicle's engine may operate at a cooler temperature. Moving the lead vehicle to a following position may reduce engine and exhaust gas temperature of the former lead vehicle since follower vehicles may operate at lower loads while maintaining vehicle speed behind the lead vehicle. The lower operating load of follower vehicles may be due to being within the slip stream of other vehicles.

At 306, method 300 judges if an amount of NH$_3$ slip from exhaust of the leader vehicle is greater than a threshold temperature. If so, the answer is yes and method 300 proceeds to 330. Otherwise, the answer is no and method 300 proceeds to 308.

Method 300 may request that the lead vehicle move to a follower position in the vehicle platoon in response to NH$_3$ slip from the lead vehicle to reduce NH$_3$ slip from the lead vehicle. In particular, operating in a lead vehicle position may result in higher exhaust gas temperatures, which may result in NH$_3$ slip. By moving the lead vehicle to a follower position in the vehicle platoon, exhaust gas temperature of the former lead vehicle may be reduced, thereby reducing NH$_3$ slip.

At 308, method 300 judges if an emissions system diagnostic is requested. If so, the answer is yes and method 300 proceeds to 330. Otherwise, the answer is no and method 300 proceeds to 310.

It may be beneficial for an emissions diagnostic for a SCR to be performed at lower exhaust gas temperatures. Specifically, a signal to noise ratio of emissions signals for diagnosing operation of a SCR may improve at temperatures near SCR light off temperature. By moving the lead vehicle to a follower position in the vehicle platoon, exhaust gas temperature of the former lead vehicle may be reduced to lower SCR temperature and improve SCR diagnostics.

In another example, an emission diagnostic may include selectively deactivating cylinders via ceasing fuel delivery to the deactivated cylinders and holding intake and exhaust valves of the cylinder in a closed state for more than two entire engine revolutions. By moving from a lead position in the platoon to a follower position, the former lead vehicle may enter cylinder deactivation modes more frequently because engines of follower vehicles may operate at lower load levels so that operation of cylinder valve actuators may be diagnosed. In one example, the valve actuators may be diagnosed via holding intake and exhaust valves in a closed state and observing air flow through the engine. If air flow is greater than a threshold, it may be found that one or more valve actuators are degraded. Thus, by switching from a lead position in the platoon to a follower position, cylinder deactivation modes may be entered more frequently in the follower vehicle so that diagnostics may be performed.

In still another example, a catalyst oxygen storage capacity emission diagnostic may include selectively entering deceleration fuel shut off (e.g., deactivating fuel supplied to engine cylinders) so that oxygen storage capacity of a catalyst may be determined. In one example, a rich exhaust mixture may be supplied to a catalyst until substantially all oxygen stored in a catalyst is consumed. Then, the engine enters decoration fuel shut off so that oxygen may enter the catalyst via a lean gas mixture entering the catalyst. The amount of oxygen flowing into the catalyst after deactivating cylinders via ceasing fuel delivery to the deactivated cylinders until a lean gas mixture is observed behind the catalyst may be determined to be the oxygen storage capacity of the catalyst. If oxygen storage capacity of the catalyst is less than a threshold, it may be determined that the catalyst is degraded.

At 310, method 300 judges if a follower vehicle is requesting the lead position in the vehicle platoon. A follower vehicle may request the lead vehicle position via broadcasting a request to the lead vehicle or a remote host that may control the vehicle platoon. If a follower vehicle is requesting the lead position and the leader vehicle accepts the request or the platoon controller accepts the request, the answer is yes and method 300 proceeds to 314. Otherwise, the answer is no and method 300 proceeds to 332.

At 312, method 300 judges if the leader vehicle accepts a position swap request from a follower vehicle. The leader vehicle may reject a request of a follower vehicle to assume the lead position in response to traffic conditions or conditions of the lead vehicle. For example, if the lead vehicle recently became the lead vehicle and there has been insufficient time for an emissions device of the lead vehicle to reach a desired temperature, the lead vehicle may deny the lead vehicle position to the follower vehicle. Several follower vehicles may request the lead position within the platoon at the same time. On the other hand, if the lead vehicle is operating within expected parameters and traffic conditions permit a vehicle position swap, the lead vehicle may relinquish the lead vehicle position to a follower vehicle. If method judges that the lead vehicle is accepting a vehicle position swap request, the answer is yes and method 300 proceeds to 314. Otherwise, the answer is no and method 300 proceeds to 332.

At 332, method 300 maintains the lead vehicle in the lead position of the platoon. Method 300 proceeds to exit.

At 314, method 300 arbitrates which of a plurality of follower vehicles may assume the leader position. In one example, a weighted sum of factors is determined for each of the vehicles. In one example, the weighted sum is determined via the following equation:

$$veh\_status\_level = K1 \cdot f(vp) + K2 \cdot f(emiseff) + K3 \cdot f(regen) + K4 \cdot f(drag)$$

where veh_status_level is the numerical status level for the vehicle and each vehicle has a vehicle status level, the vehicle status level is the basis for selecting which follower vehicle becomes the leader vehicle. Weighting factor vp is vehicle position, vehicles located closer to the leader in the platoon may be assigned higher number values to increase priority of vehicles closer to the lead vehicle. Weighting factor emiseff is vehicle emissions conversion efficiency, vehicles exhibiting lower emissions conversion efficiency may be assigned higher number values to increase priority of less efficient vehicles. Weighting factor regen is an emissions component regeneration request, vehicles with an emissions device regeneration request may be assigned higher number values to increase priority for assuming the lead position in the vehicle platoon. Weighting factor drag is vehicle wind drag, vehicles having a larger frontal surface area may be assigned higher number values to increase priority of vehicles closer to the lead vehicle. K1-K5 are weighting factors associated with the various ranking factors. Method 300 proceeds to 316 after status levels for each vehicle are determined. The status levels of the vehicles are the basis for determining vehicle positions within the platoon.

At 316, method 300 selects the follower vehicle that will assume the lead position in the vehicle platoon. In one example, the follower vehicle that has a highest weighted sum or status level is granted the leader position in the vehicle platoon. In addition, the vehicle's order in the platoon may be determined from the vehicle status level. In one example, the vehicles are arranged in the platoon first to last based on the status level of each vehicle. The highest status vehicle may be assigned the lead position and the lowest status vehicle may be assigned the end vehicle position. Thus, if the platoon includes three vehicles, the number one vehicle having a status of 25, the number two vehicle having a status of 99, and the third vehicle having a status of 55, the platoon may be arranged with vehicle number two in the lead position, vehicle number three in the second position, and vehicle number one in the end position. Method 300 proceeds to 318 after vehicle positions within the vehicle platoon have been assigned based on the status level of each vehicle.

At 318, method 300 changes the positions of the leader and follower vehicles. In one example, where the status level of a vehicle in a third position of a platoon is a highest status level, the lead vehicle may switch positions with the vehicle in the third position as described in FIG. 1B. The vehicle in the lead position may be decelerated to a follower position and a vehicle in a follower position may be accelerated to the lead vehicle position. Method 300 proceeds to 322.

At 320, method 300 adjusts positions of other vehicles in the platoon responsive to arbitration. In particular, the vehicles may be arranged based on the status level of each vehicle in the platoon as previously described. However, if traffic is heavy only the lead vehicle and a single follower vehicle may switch positions. Method 300 proceeds to exit.

At 330, method 300 judges if at least one follower vehicle accepts a position swap request from a lead vehicle. The lead vehicle may broadcast a request to assume a follower position, and the follower vehicles may reject a request of a lead vehicle to assume the lead position in response to traffic conditions or conditions of the follower vehicle. For example, if the follower vehicle is operating at higher engine loads and lower emissions device temperatures in the follower vehicle are desired, the follower vehicle may deny the lead vehicle position swap request. On the other hand, if the follower vehicle is operating within expected parameters and traffic conditions permit a vehicle position swap, the follower vehicle may relinquish its position to the lead vehicle. More than a single follower vehicle may accept the lead vehicle's request. If method judges that the follower vehicle is accepting a vehicle position swap request, the answer is yes and method 300 proceeds to 334. Otherwise, the answer is no and method 300 proceeds to 332.

At 334, method 300 arbitrates the leader position as described at 314. Method 300 proceeds to 336 where the follower vehicle is selected to replace the lead vehicle. The follower vehicle is selected to replace the lead vehicle as described at 316. Method 300 proceeds to 338. At 338, method 300 allows the follower vehicle to swap positions with the lead vehicle as described at 318. Method 300 then proceeds to 340 where the positions of other vehicles in the platoon may be adjusted as described at 320. Method 300 proceeds to 342.

At 342, method 400 performs emissions diagnostics on the former lead vehicle if the former lead vehicle requested a position swap in response to a request for emissions diagnostics in the lead vehicle. For example, method 300 may determine oxygen storage capacity of a catalyst, determine efficiency of a SCR, or selectively deactivate engine cylinders to diagnose cylinder valve actuators. If emissions diagnostics in the former lead vehicle are not requested, then temperatures of the former lead vehicle are allowed to decrease since the former lead vehicle is now operating in slip stream of another vehicle. Method 300 proceeds to exit.

In this way, operation of a lead vehicle may be adjusted responsive to lead vehicle operating conditions, follower vehicle operating conditions, and traffic conditions. The lead vehicle may perform method 300 or a remote controller may perform method 300 to judge how the lead vehicle performs. The remote controller may command the lead vehicle and follower vehicles to perform the actions described in method 300.

Figure 4A:
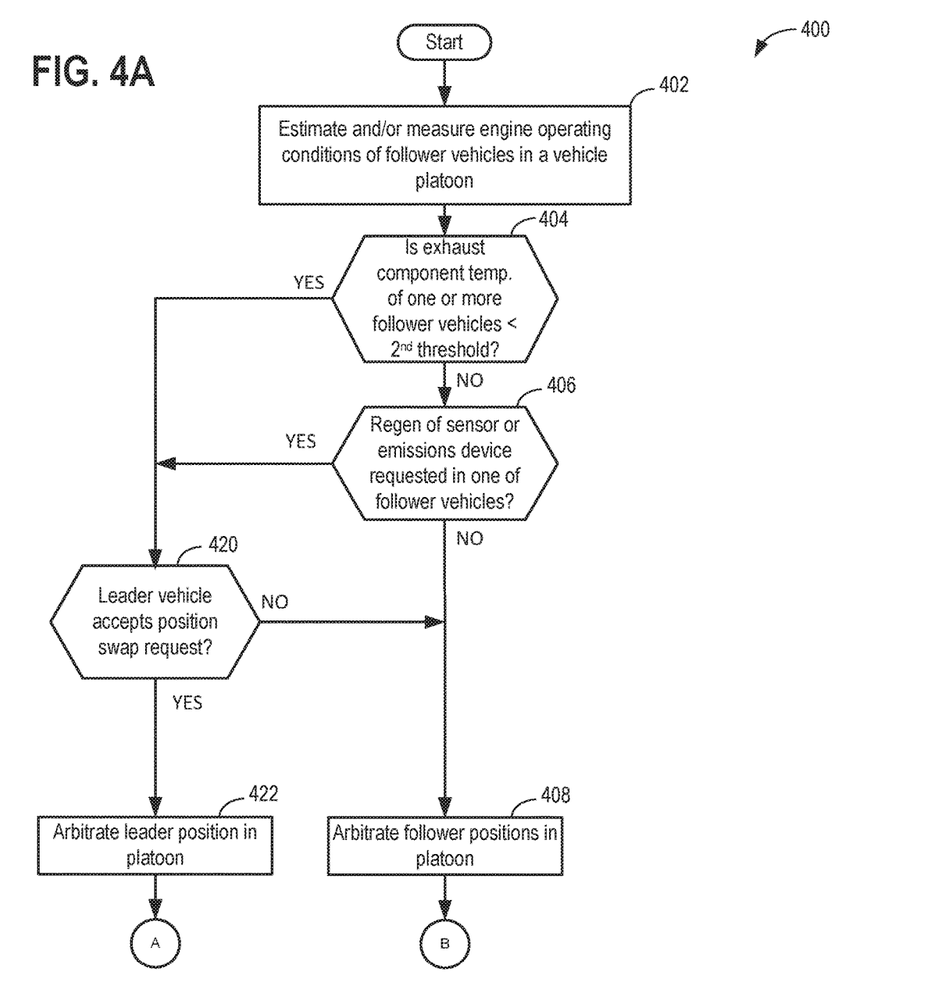
FIGS. 4A and 4B show a flowchart of a method for operating follower vehicles in a platoon of vehicles.
Figure 4B:
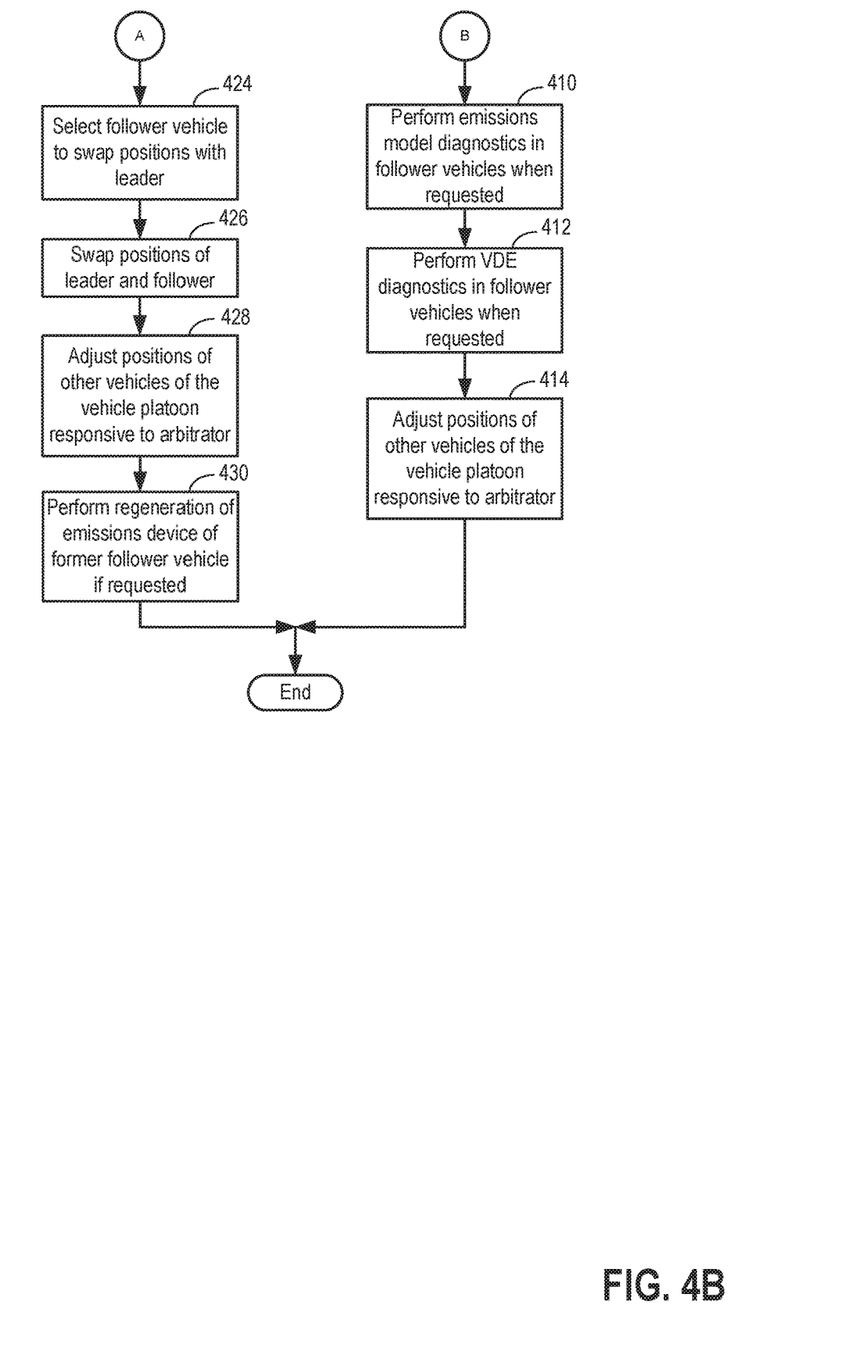

Referring now to FIGS. 4A and 4B, a method for operating a following vehicle in a platoon of vehicles is shown. The method of FIGS. 4A and 4B may be incorporated into the system of FIG. 1A and FIG. 2 as executable instructions stored in non-transitory memory. Further, the method of FIGS. 4A and 4B may operate in cooperation and conjunction with the method of FIGS. 3A and 3B to provide the sequence shown in FIG. 6.

At 402, method 400 estimates and/or measures vehicle operating conditions of vehicles in following positions of the vehicle platoon. The operating conditions may include but are not limited to lead vehicle emissions device temperature, lead vehicle $NH_3$ slip (e.g., $NH_3$ that is flowing past emissions after treatment device 152 and to ambient atmosphere), emission diagnostic status for the lead vehicle, requests from follower vehicles to be lead vehicle in the vehicle platoon, positions of vehicles surrounding the lead vehicle, and environmental conditions. The conditions may be determined from output of various sensors and actuators coupled to the controller. Method 400 proceeds to 404.

At 404, method 400 judges if a temperature of an exhaust system component is less than a second threshold temperature. The exhaust system component may be a component of an emission system or an exhaust manifold. The temperature threshold may be different for each of the exhaust system components. For example, the PF temperature threshold may be a first value and the SCR temperature threshold may be a second value. If method 300 judges that temperature of an exhaust system component is less than a threshold, the answer is yes and method 400 proceeds to 420. Otherwise, method 400 proceeds to 406.

If a temperature of an exhaust system component is less than a threshold temperature, method 400 may request to change a position of the follower vehicle to the leader position so that the vehicle's engine may operate to produce warmer exhaust gases. Moving the following vehicle to the leading position may increase engine and exhaust gas temperatures of the former follower vehicle since leader vehicles may operate at higher loads to provide a slip stream for following vehicles.

At 406, method 400 judges if regeneration of an emission sensor or emissions device is requested. An emissions sensor may be regenerated at a different time or interval than other emissions control devices. An emissions device may be regenerated when the storage capacity of an emission control device is less than a threshold. An emissions sensor may be regenerated when soot accumulated in the sensor is greater than a threshold. If method 300 judges that regeneration of an emissions sensor or device (e.g., a particulate filter) is desired or requested, the answer is yes and method 400 proceeds to 420. Otherwise, the answer is no and method 400 proceeds to 408.

At 408, method 400 arbitrates follower positions within the vehicle platoon. As discussed at 314, weighted sums of factors for each follower vehicle are determined and the follower vehicles are arrange in positions within the platoon responsive to the individual status levels of each follower vehicle. In one example, vehicles are arranged in following positions from highest status level to lowest status level. For example, if the platoon includes three follower vehicles, one follower vehicle having a status of 25, one follower vehicle having a status of 59, and the third follower vehicle having a status of 35, the platoon may be arranged with the lead vehicle followed by the vehicle having the status value of 59, then by the vehicle having the status value of 35, then by the vehicle having the status value of 25. Method 300 then commands the follower vehicles to their respective positions responsive to the status levels of each follower vehicle. Method 400 proceeds to 410.

At 410, method 400 performs emissions diagnostics on the follower vehicle requesting emissions diagnostics. For example, method 400 may determine oxygen storage capacity of a catalyst, determine efficiency of a SCR, or determine if a particulate filter is filled with particulate matter. Method 400 proceeds to 412.

At 412, method 400 performs variable displacement engine (VDE) diagnostics in follower vehicles when requested. In some cases, cylinder valve actuators may be commanded active or deactivated to activate and deactivate selected engine cylinders. Because follower vehicles operate at lower engine loads, they may be able to enter and exit cylinder deactivation modes more frequently than the leader vehicle. The cylinder valve actuators may be diagnosed via assessing positions of actuators or via engine air flow and pressure sensors. Method 400 performs VDE diagnostics and proceeds to 414.

At 414, method 400 adjusts positions of other vehicles in the platoon responsive to arbitration. Specifically, the vehicles may be arranged based on the status level of each vehicle in the platoon as previously described. However, if traffic is heavy only the lead vehicle and a single follower vehicle may switch positions. Method 400 proceeds to exit.

At 420, method 400 judges if the leader vehicle accepts a position swap request from a follower vehicle. The leader vehicle may reject a request of a follower vehicle to assume the lead position in response to traffic conditions or conditions of the lead vehicle. On the other hand, if the lead vehicle is operating within expected parameters and traffic conditions permit a vehicle position swap, the lead vehicle may relinquish the lead vehicle position to a follower vehicle. If method judges that the lead vehicle is accepting a vehicle position swap request, the answer is yes and method 400 proceeds to 422. Otherwise, the answer is no and method 400 proceeds to 408.

At 422, method 400 arbitrates the leader position as described at 314. Method 400 proceeds to 424 where the follower vehicle is selected to replace the lead vehicle. The follower vehicle is selected to replace the lead vehicle as described at 316. Method 400 proceeds to 436.

At 426, method 400 allows the follower vehicle to swap positions with the lead vehicle as described at 318. Method 400 then proceeds to 428 where the positions of other vehicles in the platoon may be adjusted as described at 320. Method 400 proceeds to 430.

At 430, method 400 performs regeneration of the emissions control device or emission sensor if requested. The regeneration may include increasing engine exhaust temperature to oxidize particulate matter or to discharge sulfur from emissions devices. Method 400 proceeds to exit after regenerating emissions control devices and/or sensors.

In this way, operation of follower vehicles may be adjusted responsive to lead vehicle operating conditions, follower vehicle operating conditions, and traffic conditions. The follower vehicles may perform method 400 or a remote controller may perform method 400 to judge how the follower vehicles perform. The remote controller may command the follower vehicles to perform the actions described in method 400.

Thus, the method of FIGS. 3A-4B provide for a method for operating vehicles, comprising: moving a vehicle from a lead position in a vehicle group to a first follower position within the vehicle group and moving a first following vehicle into the leading position in the vehicle group in response to a temperature of an emissions control device of the first following vehicle being less than a first threshold temperature. The first follower position may be any follower position in the vehicle platoon.

In some examples, the method further comprises moving the vehicle from the lead position in the vehicle group to a second follower position within the vehicle group and moving the vehicle in the second follower position into the leading position in the vehicle group in response to a temperature of an emissions control device of the vehicle in the lead position being greater than a second threshold temperature. The method includes where the vehicle in the second follower position is selected to move to the lead position in response to a temperature of an emissions control device of the vehicle in the second follower position. The method includes where the vehicle in the second follower position is selected to move to the lead position in response to an amount of exhaust emissions stored in an emissions control device of the vehicle in the second follower position. The method includes where vehicle group includes a plurality of vehicles, and further comprising: the vehicle group traveling in a series one after the other formation with at least one vehicle in the vehicle group being within an air slip stream of another vehicle in the vehicle group. The method includes where moving the vehicle from the lead position in the vehicle group to the first follower position in the vehicle group includes decelerating the vehicle in the lead position, and where moving the following vehicle into the leading position in the vehicle group includes accelerating the following vehicle. The method further comprises selecting which of the first following vehicle and a second following vehicle moves to the lead position when both the first following vehicle and the second following vehicle request the lead position via arbitrating between the first following vehicle and a second following vehicle. The method includes where the arbitration is responsive to a first weighted sum of factors for the first following vehicle and a second weighted sum of factors for the second following vehicle.

The methods of FIGS. 3A-4B also provide for a method for operating vehicles, comprising: moving a vehicle from a lead position in a vehicle group to a first follower position within the vehicle group and moving a first following vehicle into the leading position in the vehicle group in response to a request to regenerate an emissions control device of the first following vehicle. The method includes where the first following vehicle is a vehicle positioned in the vehicle group other than at the lead position, the first following vehicle located after the leader vehicle and at or before a last vehicle in the vehicle group. The method includes where the emissions control device is a particulate filter. The method includes where the emissions control device is a particulate filter sensor. The method includes where the first follower position is located after the lead position and at or before a last vehicle in the vehicle group. The method further comprises moving the vehicle from the lead position in the vehicle group to the first follower position in the vehicle group in response to a request to perform a diagnostic on an emissions control device.

Referring now to FIG. 5, a plot showing efficiency of an emissions control device is shown. The plot's vertical axis represents NOx conversion efficiency for the emissions control device. The plot's horizontal axis represents gas temperature at the inlet of the emissions control device. Curve 510 describes the NOx conversion efficiency of the emissions control device. Vertical marker 502 represents a lower boundary of a desired NOx conversion efficiency range that extends to vertical marker 508. The NOx efficiency within the range of the emissions inlet gas temperature at 502 and the emissions temperature at 508 is substantially constant and at a higher level. However, for temperatures lower than the temperature at 502 and higher than the temperature at inlet temperature reference 508, the NOx conversion efficiency declines rapidly. As such, if the inlet temperature is less than at inlet temperature reference 508 and decreasing in the direction of arrow 550, it may be observed that the possibility of reduced NOx conversion efficiency may be reduced if mitigating action is taken when the emissions inlet gas temperature is at threshold 504. By taking mitigating action at 504 (e.g., changing position of a vehicle from a follower to leader and increasing exhaust gas temperatures), it may be possible to avoid temperatures less than at threshold 502 so that a desired level of emissions may be provided. Conversely, if the inlet temperature is greater than at inlet temperature reference 502 and increasing in the direction of arrow 551, it may be observed that the possibility of reduced NOx conversion efficiency may be reduced if mitigating action is taken when the emissions inlet gas temperature is at threshold 506. By taking mitigating action at 504 (e.g., changing position of a vehicle from a leader to follower and decreasing exhaust gas temperatures), it may be possible to avoid temperatures greater than at threshold 508 so that a desired level of emissions may be provided. In this way, exhaust gas temperature may be a basis for judging whether or not to move a vehicle to a different position in the vehicle platoon before emissions of the vehicle degrade.

Referring now to FIG. 6, an example prophetic plot showing a vehicle platooning sequence according to the methods of FIGS. 3A-4B is shown. The operating sequence of FIG. 6 may be produced via the system of FIGS. 1A-2 executing instructions of the methods described in FIGS. 3A-4B and 6B. Each plot shown in FIG. 6 occurs at the same time as the other plots in FIG. 6, and vertical markers T0-T7 indicate times of particular interest during the sequence.

The first plot from the top of FIG. 6 is a plot identifying the position of vehicle number one in a vehicle platoon versus time. The vertical axis represents the position of vehicle number one in the platoon. The "L" designation indicates that vehicle number one is the leader of the platoon. The "F" designation indicates that vehicle number one is a follower in the platoon. The horizontal axis represents time and time increases from the left side of the figure to the right side of the figure.

The second plot from the top of FIG. 6 is a plot indicating a temperature of an emissions control device of vehicle number one in a vehicle platoon versus time. The vertical axis represents the temperature of an emissions control device of vehicle number one in the platoon, and temperature increases in the direction of the vertical axis arrow. The horizontal axis represents time and time increases from the left side of the figure to the right side of the figure. Horizontal line 602 represents an upper threshold temperature for an emissions control device and horizontal line 604 represents a lower threshold temperature for the emissions control device.

The third plot from the top of FIG. 6 is a plot indicating an amount of $NH_3$ slip from vehicle number one in a vehicle platoon versus time. The vertical axis represents $NH_3$ slip from vehicle number one in the platoon, and the amount of $NH_3$ slip increases in the direction of the vertical axis arrow. The horizontal axis represents time and time increases from the left side of the figure to the right side of the figure. Horizontal line 606 represents a threshold amount of $NH_3$ slip. It may be desired to keep $NH_3$ slip from the number one vehicle below threshold 606.

The fourth plot from the top of FIG. 6 is a plot indicating whether or not there is an emissions diagnostic request for vehicle number one in a vehicle platoon versus time. A request for emissions system diagnosis is indicated when the trace is at a higher level near the vertical axis arrow. A request for emissions system diagnosis is not requested when the trace is at a lower level near the horizontal axis. The emissions diagnostic request may be to estimate oxygen storage capacity of a catalyst, determine SCR efficiency, or other emissions diagnostic. The horizontal axis represents time and time increases from the left side of the figure to the right side of the figure.

The fifth plot from the top of FIG. 6 is a plot indicating whether or not there is an emissions device regeneration request for vehicle number one in a vehicle platoon versus time. A request for emissions device regeneration is indicated when the trace is at a higher level near the vertical axis arrow. A request for emissions device regeneration is not requested when the trace is at a lower level near the horizontal axis. The horizontal axis represents time and time increases from the left side of the figure to the right side of the figure.

The sixth plot from the top of FIG. 6 is a plot identifying the position of vehicle number two in a vehicle platoon versus time. The vertical axis represents the position of vehicle number two in the platoon. The "L" designation indicates that vehicle number one is the leader of the platoon. The "F" designation indicates that vehicle number two is a follower in the platoon. The horizontal axis represents time and time increases from the left side of the figure to the right side of the figure.

The seventh plot from the top of FIG. 6 is a plot indicating a temperature of an emissions control device of vehicle number two in a vehicle platoon versus time. The vertical axis represents the temperature of an emissions control device of vehicle number two in the platoon, and temperature increases in the direction of the vertical axis arrow. The horizontal axis represents time and time increases from the left side of the figure to the right side of the figure. Horizontal line 610 represents an upper threshold temperature for an emissions control device and horizontal line 612 represents a lower threshold temperature for the emissions control device.

The eighth plot from the top of FIG. 6 is a plot indicating an amount of $NH_3$ slip from vehicle number two in a vehicle platoon versus time. The vertical axis represents $NH_3$ slip from vehicle number two in the platoon, and the amount of $NH_3$ slip increases in the direction of the vertical axis arrow. The horizontal axis represents time and time increases from the left side of the figure to the right side of the figure. Horizontal line 614 represents a threshold amount of $NH_3$ slip. It may be desired to keep $NH_3$ slip from the number two vehicle below threshold 614.

The ninth plot from the top of FIG. 6 is a plot indicating whether or not there is an emissions diagnostic request for vehicle number two in a vehicle platoon versus time. A request for emissions system diagnosis is indicated when the trace is at a higher level near the vertical axis arrow. A request for emissions system diagnosis is not requested when the trace is at a lower level near the horizontal axis. The emissions diagnostic request may be to estimate oxygen storage capacity of a catalyst, determine SCR efficiency, or other emissions diagnostic. The horizontal axis represents time and time increases from the left side of the figure to the right side of the figure.

The tenth plot from the top of FIG. 6 is a plot indicating whether or not there is an emissions device regeneration request for vehicle number two in a vehicle platoon versus time. A request for emissions device regeneration is indicated when the trace is at a higher level near the vertical axis arrow. A request for emissions device regeneration is not requested when the trace is at a lower level near the horizontal axis. The horizontal axis represents time and time increases from the left side of the figure to the right side of the figure.

At time T0, the vehicle number one is in a leader position in the vehicle platoon and the emissions device temperature for vehicle number one is less than threshold 602 and greater than threshold 604. There is no $NH_3$ slip from vehicle number one and no emissions diagnostic request from vehicle number one. Vehicle number one is not requesting regeneration of an emissions device.

Vehicle number two is in a follower position and its emission device temperature is between threshold 610 and threshold 612. Vehicle number two is not slipping $NH_3$ and it is not requesting emissions diagnostics. Further, vehicle number two is not requesting emissions device regeneration.

At time T1, the vehicle number one switches from the leader position in the vehicle platoon to a follower position in response to the emissions device temperature for vehicle number one exceeding threshold 602. There is no $NH_3$ slip from vehicle number one and no emissions diagnostic request from vehicle number one. Vehicle number one is not requesting regeneration of an emissions device. By moving to a follower position, vehicle number one may operate at lower loads and temperatures.

Vehicle number two moves to the lead position in response to a request by vehicle number one to assume a follower position (not shown). The emissions device temperature for vehicle number two is between threshold 610 and threshold 612. Vehicle number two is not slipping $NH_3$ and it is not requesting emissions diagnostics. Further, vehicle number two is not requesting emissions device regeneration.

At time T2, the vehicle number one switches from the follower position in the vehicle platoon to a leader position in response to a request from vehicle number two to enter a follower position in response to the emissions device temperature for vehicle number two exceeding threshold 610. There is no $NH_3$ slip from vehicle number one and no emissions diagnostic request from vehicle number one. Vehicle number one is not requesting regeneration of an emissions device. By moving to a follower position, vehicle number two may operate at lower loads and temperatures to reduce emissions device temperature.

Vehicle number two moves to the follower position when granted permission via vehicle number one. The emissions device temperature for vehicle number two begins to decline after it moves to the follower position. Vehicle number two is not slipping $NH_3$ and it is not requesting emissions diagnostics. Further, vehicle number two is not requesting emissions device regeneration.

At time T3, the vehicle number one switches from the leader position in the vehicle platoon to a follower position in response to $NH_3$ slip from the number one vehicle exceeding threshold 606. There is no emissions diagnostic request from vehicle number one. Further, vehicle number one is not requesting regeneration of an emissions device. By moving to a follower position, exhaust temperatures of vehicle number one may be reduced to lower $NH_3$ slip since $NH_3$ slip may be a function of temperature.

Vehicle number two moves to the lead position in response to a request by vehicle number one to assume a follower position (not shown). The emissions device temperature for vehicle number two is between threshold 610 and threshold 612. Vehicle number two is not slipping $NH_3$ and it is not requesting emissions diagnostics. Further, vehicle number two is not requesting emissions device regeneration.

At time T4, the vehicle number one switches from the follower position in the vehicle platoon to a leader position in response to a request from vehicle number two to enter a follower position in response to the emissions device diagnostic request for vehicle number two. There is no $NH_3$ slip from vehicle number one and no emissions diagnostic request from vehicle number one. Vehicle number one is not requesting regeneration of an emissions device. By moving to a follower position, vehicle number two may operate at lower loads and temperatures where a signal to noise ratio for emissions diagnostics may be improved.

Vehicle number two moves to the follower position when granted permission via vehicle number one. The emissions device temperature for vehicle number two begins to decline after it moves to the follower position. Vehicle number two is not slipping $NH_3$. Further, vehicle number two is not requesting emissions device regeneration.

At time T5, the vehicle number one switches from the leader position in the vehicle platoon to a follower position in response to an emissions diagnostic request from the number one vehicle. In addition, vehicle number one is not requesting regeneration of an emissions device. By moving to a follower position, exhaust temperatures of vehicle number one may be reduced to improve the signal to noise ratio for emissions diagnostics for vehicle number one.

Vehicle number two moves to the lead position in response to a request by vehicle number one to assume a follower position (not shown). The emissions device temperature for vehicle number two is between threshold 610 and threshold 612. Vehicle number two is not slipping $NH_3$ and it is not requesting emissions diagnostics. Further, vehicle number two is not requesting emissions device regeneration.

At time T6, vehicle number one switches from the follower position in the vehicle platoon to a leader position in response to a request from vehicle number two to occupy a follower position in the platoon. Vehicle number two requests a follower position in response to emission device temperature of vehicle number two exceeding threshold 610. There is no $NH_3$ slip from vehicle number one and no emissions diagnostic request from vehicle number one. Vehicle number one is not requesting regeneration of an emissions device. By moving to a follower position, vehicle number two may operate at lower loads and temperatures where emissions device temperature may be lowered.

Vehicle number two moves to the follower position when granted permission via vehicle number one. The emissions device temperature for vehicle number two begins to decline after it moves to the follower position. Vehicle number two is not slipping $NH_3$. Further, vehicle number two is not requesting emissions device regeneration.

At time T7, the vehicle number one switches from the leader position in the vehicle platoon to a follower position in response to a request to regenerate an emissions control device from the number two vehicle. In addition, vehicle number one is not requesting regeneration of an emissions device. By moving the follower vehicle to the lead position, exhaust temperatures of the number two vehicle may be increased to improve regeneration of emissions devices.

Vehicle number two moves to the lead position in after it is authorized by vehicle number one. The emissions device temperature for vehicle number two begins to increases to improve emissions device regeneration. Vehicle number two is not slipping $NH_3$ and it is not requesting emissions diagnostics. Further, vehicle number two is not requesting emissions device regeneration.

In this way, vehicles of a platoon may change positions within the platoon to improve or maintain emissions levels. Further, if $NH_3$ slip is observed, vehicle positions may be adjusted to reduce the possibility of additional $NH_3$ slip.

It should be noted for FIG. 6 that it may take a few second to a few minutes to perform the vehicle position swaps. The vehicle position signals of FIG. 6 may be indicative of signals or requests to perform the vehicle position change rather than the actual vehicle position in some examples.

As will be appreciated by one of ordinary skill in the art, the method described in FIGS. 4A-4B may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating vehicles, comprising:
moving a vehicle from a lead position in a vehicle group to a first follower position within the vehicle group via a controller and moving a first following vehicle into the lead position in the vehicle group via the controller in response to a temperature of an emissions control device of the first following vehicle being less than a first threshold temperature.

2. The method of claim 1, further comprising moving a vehicle in a second follower position into the lead position in the vehicle group in response to a temperature of the emissions control device being greater than a second threshold temperature.

3. The method of claim 2, where the vehicle in the second follower position is selected to move to the lead position in response to a temperature of an emissions control device of the vehicle in the second follower position.

4. The method of claim 2, where the vehicle in the second follower position is selected to move to the lead position in response to an amount of exhaust emissions stored in an emissions control device of the vehicle in the second follower position.

5. The method of claim 1, where the vehicle group includes a plurality of vehicles, and further comprising:
the vehicle group traveling in a series one after the other formation with at least one vehicle in the vehicle group being within an air slip stream of another vehicle in the vehicle group.

6. The method of claim 1, where moving the vehicle from the lead position in the vehicle group to the first follower position in the vehicle group includes decelerating the vehicle in the lead position, and where moving the first following vehicle into the lead position in the vehicle group includes accelerating the first following vehicle.

7. The method of claim 1, further comprising selecting which of the first following vehicle and a second following vehicle moves to the lead position when both the first following vehicle and the second following vehicle request the lead position via arbitrating between the first following vehicle and the second following vehicle.

8. The method of claim 7, where the arbitration is responsive to a first weighted sum of factors for the first following vehicle and a second weighted sum of factors for the second following vehicle.

9. A method for operating vehicles, comprising:
moving a vehicle from a lead position in a vehicle group to a first follower position within the vehicle group via a controller and moving a first following vehicle into the lead position in the vehicle group via the controller in response to a request to regenerate an emissions control device of the first following vehicle.

10. The method of claim 9, where the first following vehicle is a vehicle positioned in the vehicle group other than at the lead position, the first following vehicle located after the vehicle in the lead position and at or before a last vehicle in the vehicle group.

11. The method of claim 9, where the emissions control device is a particulate filter.

12. The method of claim 9, where the emissions control device is a particulate filter sensor.

13. The method of claim 9, where the first follower position is located after the lead position and at or before a last vehicle in the vehicle group.

14. The method of claim 9, further comprising moving a vehicle in the vehicle group to the first follower position in the vehicle group in response to a request to perform a diagnostic on an emissions control device.

15. A system for controlling vehicles, comprising:
a first vehicle including a receiver, a first transmitter, a first engine, and a first emissions control device, the first vehicle in a leader position in a vehicle group;
a second vehicle including a receiver, a second transmitter, a second engine, and a second emissions control device, the second vehicle a follower in the vehicle group; and
a controller including instructions stored in non-transitory memory to arbitrate requests for the leader position in the vehicle group, the requests for the leader position originating from a plurality of vehicles in the vehicle group within a window of time, the requests for the leader position based on requests for regenerating emissions control devices and temperatures of emissions control devices, and additional instructions to command one vehicle of the plurality of vehicles to the leader position.

16. The system of claim 15, further comprising additional instructions to command the second vehicle to the leader position in response to a request to perform an emissions diagnostic on the first vehicle.

17. The system of claim 15, further comprising additional instructions to command the second vehicle to the leader position in response to $NH_3$ slip from the first vehicle.

18. The system of claim 15, further comprising additional instructions to command the first vehicle to a following position in the vehicle group in response to a request to estimate an oxygen storage capacity of a catalyst.

19. The system of claim 15, further comprising additional instructions to command slowing the first vehicle in response to the requests for the leader position.

20. The system of claim 15, further comprising additional instructions to command accelerating the second vehicle in response to the requests for the leader position.

* * * * *